United States Patent
Adolf et al.

(10) Patent No.: US 10,418,856 B2
(45) Date of Patent: Sep. 17, 2019

(54) SYSTEMS AND METHODS FOR WIRELESS CHARGING

(71) Applicant: X Development LLC, Mountain View, CA (US)

(72) Inventors: Brian Adolf, Mountain View, CA (US); Eric Liu, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 301 days.

(21) Appl. No.: 15/353,638

(22) Filed: Nov. 16, 2016

(65) Prior Publication Data

US 2018/0138748 A1 May 17, 2018

(51) Int. Cl.
*H02J 50/40* (2016.01)
*H02J 50/12* (2016.01)
*H02J 7/02* (2016.01)
*H02J 50/90* (2016.01)

(52) U.S. Cl.
CPC .............. *H02J 50/12* (2016.02); *H02J 7/025* (2013.01); *H02J 50/40* (2016.02); *H02J 50/90* (2016.02)

(58) Field of Classification Search
CPC .. H02J 50/12; H02J 50/40; H02J 7/025; H02J 50/90
See application file for complete search history.

(56) References Cited

U.S. PATENT DOCUMENTS

| | | | |
|---|---|---|---|
| 6,956,500 B1 * | 10/2005 | Ducharme | G01D 4/008 340/870.02 |
| 7,801,794 B2 * | 9/2010 | Gustafson | G06Q 40/00 705/35 |
| 7,945,502 B2 * | 5/2011 | Mashinsky | G06Q 40/00 705/35 |
| 8,694,409 B2 * | 4/2014 | Chassin | G06Q 20/102 361/1 |
| 8,816,638 B2 | 8/2014 | Vorenkamp et al. | |
| 9,026,347 B2 * | 5/2015 | Gadh | H02J 3/14 701/123 |

(Continued)

FOREIGN PATENT DOCUMENTS

KR  10-2014-0032631       3/2014
WO  WO-2014038779 A1 *   3/2014  ............. H01F 38/14

OTHER PUBLICATIONS

Written Opinion, International Application No. PCT/US2017/056133, dated Jan. 26, 2018.

*Primary Examiner* — Pinping Sun
(74) *Attorney, Agent, or Firm* — McDonnell Boehnen Hulbert & Berghoff LLP

(57) ABSTRACT

Systems and methods described herein may relate to wireless energy transfer between a transmitter and a receiver via resonant coupling. In example embodiments, a method includes identifying a receiver in a wireless power transmission system and identifying a transmitter in the wireless power transmission system. The method also includes determining a real-time per-unit offer corresponding to the identified receiver and determining a real-time per-unit request corresponding to the identified transmitter. The method yet further includes determining a real-time per-unit match based on the offer and the request. The method further includes, in response to determining the match, causing the transmitter to provide electrical energy to the receiver via a wireless resonant coupling link.

20 Claims, 6 Drawing Sheets

(56) References Cited

U.S. PATENT DOCUMENTS

| | | | |
|---|---|---|---|
| 9,101,777 B2* | 8/2015 | John | A61N 1/3785 |
| 9,349,149 B2* | 5/2016 | Lee | G06Q 20/145 |
| 9,680,313 B2* | 6/2017 | Grilli | G06Q 30/0267 |
| 10,102,595 B2* | 10/2018 | Gelonese | G06Q 10/00 |
| 2006/0270385 A1* | 11/2006 | Morris | H04W 52/0203 |
| | | | 455/405 |
| 2012/0150670 A1 | 6/2012 | Taylor et al. | |
| 2012/0290470 A1* | 11/2012 | Lee | G06Q 20/3278 |
| | | | 705/39 |
| 2012/0329405 A1 | 12/2012 | Lee et al. | |
| 2013/0043738 A1* | 2/2013 | Park | H04M 1/7253 |
| | | | 307/104 |
| 2013/0342025 A1* | 12/2013 | Cook | H02J 5/005 |
| | | | 307/104 |
| 2013/0346768 A1* | 12/2013 | Forbes, Jr. | G06F 1/266 |
| | | | 713/310 |
| 2014/0152253 A1 | 6/2014 | Ozaki et al. | |
| 2015/0097520 A1 | 4/2015 | Lin et al. | |
| 2016/0294220 A1 | 10/2016 | Kwon et al. | |
| 2016/0347193 A1* | 12/2016 | Caldwell | B60L 11/1829 |
| 2016/0359375 A1* | 12/2016 | Lee | H02J 50/12 |
| 2017/0134182 A1* | 5/2017 | Davis | H04W 4/70 |
| 2017/0353054 A1* | 12/2017 | Lee | H02J 50/12 |
| 2019/0020225 A1* | 1/2019 | Kwon | H02J 50/12 |
| 2019/0148986 A1* | 5/2019 | Yoo | H02J 7/02 |

\* cited by examiner

SYSTEMS AND METHODS FOR WIRELESS CHARGING

BACKGROUND

Unless otherwise indicated herein, the materials described in this section are not prior art to the claims in this application and are not admitted to be prior art by inclusion in this section.

Electronic devices, such as mobile phones, laptops, and tablets, have become an integral part of daily life. Other machines, such as cars, which have conventionally used non-electric power sources, are increasingly relying on electricity as a power source. As electronic devices are often mobile, it may not be feasible for devices to stay connected to a power source via wires. Thus, electronic devices may use batteries to supply electric power when a device is not coupled to a fixed power source.

Current battery technology, however, often does not meet the charge capacity and/or discharge rate demands of electronic devices, which may limit the range of moveable devices. Even in cases where batteries meet the power demands of a given device, such a device usually must be coupled to a fixed charging source via wires in order to recharge its battery. Such wired charging mechanisms may limit the movement, and thus the usability, of the device while it is being charged. Also, as the number of devices connected to a charging source increases, the number of wires in the proximity of an electrical outlet may increase, causing "cord clutter."

SUMMARY

Systems and methods described herein relate to infrastructure for wireless charging for devices such as smartphones, tablets, and other electrical devices. Namely, the infrastructure may provide for wireless background charging of a device according to an automated price negotiation system as a device user goes about normal activities. For example, a user may set default preferences for wireless charging of the device. The default preferences may include a pricing framework for a given device (e.g., a smartphone). Subsequently, as the user goes about their normal activities, the smartphone may be in the user's pocket, backpack, or purse. In such a scenario, the smartphone may automatically identify possible wireless energy transmitters and negotiate a wireless charging process. Accordingly, the smartphone will always stay charged without any need for further user intervention.

In example embodiments, a plurality of wireless chargers may be available in a given environment. Some or all of the wireless charger devices may be owned by different public and/or private entities and/or individuals. The owners of the wireless charger devices can set individual pricing for others to use their wireless chargers, so pricing can vary charger-to-charger. Correspondingly, a device owner can set a price framework for what they are willing to pay to wirelessly charge their device(s). Then, during the course of their day, as the user travels to different locations in range of different wireless charger devices, their devices can engage in automated, behind-the-scenes, negotiations with each charger device, and if there is an agreeable rate for both sides, wireless charging of the device may proceed.

Systems and methods described herein may relate to various ways to provide resonant wireless energy transfer services. Namely, example methods can involve an initial authentication process between a receiver and a wireless power transmitter. Furthermore, example methods can include determining an offer corresponding to the receiver and a request corresponding to the transmitter. In some embodiments, the offer and the request may include real-time per-unit prices for provision of wireless energy transfer. The method includes determining a match between the offer and the request (e.g., via a market maker). Upon determining a match, the method includes causing the transmitter to provide wireless power to the receiver.

In a first aspect, a system is provided. The system includes a transmitter and a receiver coupled to the transmitter via a wireless resonant coupling link. The transmitter is configured to provide electrical energy to the receiver via the wireless resonant coupling link. The system also includes a controller including at least one processor and a memory. The processor executes instructions stored in the memory so as to carry out operations. The operations include identifying the receiver and identifying the transmitter. The operations also include determining a real-time per-unit offer corresponding to the receiver and determining a real-time per-unit request corresponding to the transmitter. The operations further include determining a real-time per-unit match based on the offer and the request. The operations include, in response to determining the match, causing the transmitter to provide electrical energy to the receiver via the wireless resonant coupling link.

In a second aspect, a method is provided. The method includes identifying a receiver in a wireless power transmission system and identifying a transmitter in the wireless power transmission system. The method also includes determining a real-time per-unit offer corresponding to the identified receiver and a real-time per-unit request corresponding to the identified transmitter. The method yet further includes determining a real-time per-unit match based on the offer and the request. The method additionally includes, in response to determining the match, causing the transmitter to provide electrical energy to the receiver via a wireless resonant coupling link.

In a third aspect, a method is provided. The method includes determining a respective identity and a respective power need of each receiver of a plurality of receivers in a wireless power transmission system. The method also includes determining, based on the respective identity and respective power need, a real-time per-unit offer corresponding to each receiver. The method yet further includes determining a real-time per-unit request corresponding to a transmitter in the wireless power transmission system. The method additionally includes determining at least one real-time per-unit match based on the respective offers and the request. The method further includes, in response to determining the at least one match, causing the transmitter to provide electrical energy to the at least one corresponding receiver via at least one wireless resonant coupling link.

In a further aspect, a system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
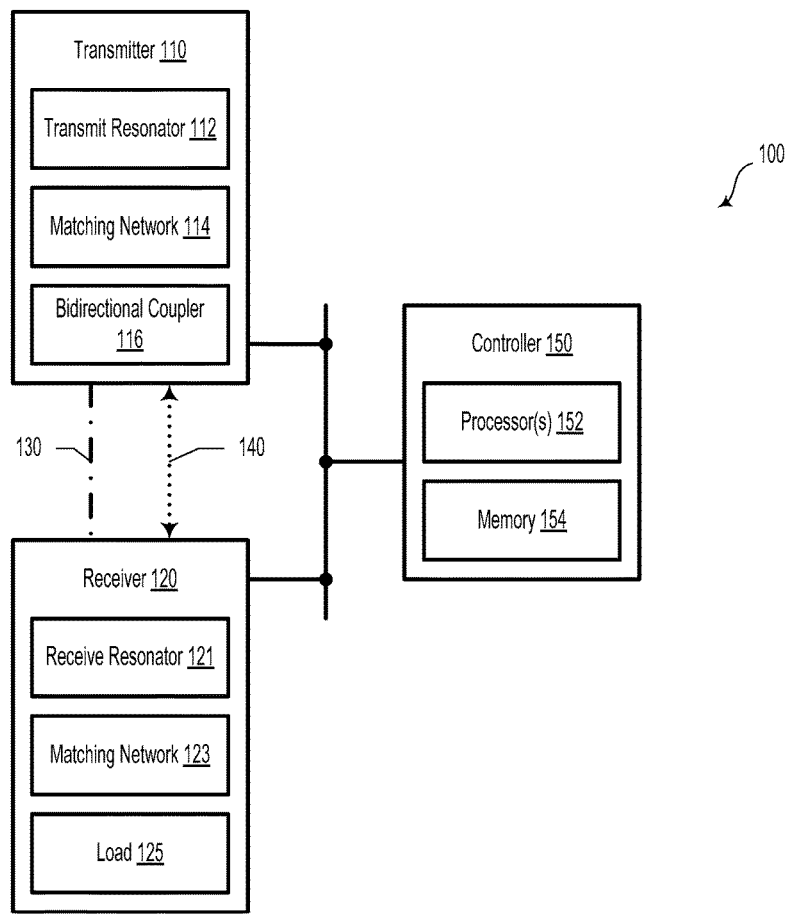
FIG. 1A illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A device user may set up a framework for wireless charging of a given device (e.g., a smartphone). Regardless of whether the smartphone is in a pocket, a backpack, a purse, or sitting on a desk, it may be able to find and negotiate wireless charging automatically, so that the user does not need to take any further action to charge their smartphone.

In other words, a powered device (e.g., a mobile phone, a laptop, a tablet, or any other type of electrically powered device) may be configured to receive energy via a near field resonant wireless charging link. In example embodiments, a plurality of wireless chargers may be in a local environment of the device. The wireless chargers may be owned and/or operated by different public and/or private entities or individuals. The owners or operators of the charging stations can set individual pricing for others to use their wireless chargers, so pricing can vary for each charger (and based on type of device, demand, time of day, and other factors). Correspondingly, a device owner can set a price framework for what they are willing to pay for wireless energy transfer to their phone. Then, during the course of a given day, as the device moves to different locations in range of different chargers, the device can engage in automated, behind-the-scenes, negotiations with each charger, and if there is an agreeable rate for both sides, the device may be charged by the selected charger at the mutually agreeable rate.

As a further example, a wireless near-field power transmission system may provide for micropayments based on an amount of power transmitted to a given receiver, which is uniquely authenticated and identifiable by a transmitter and/or a server. In example embodiments, the transmitter and receiver device (e.g., a smartphone) may negotiate a unit cost (e.g., cents per kW) via an auction process or another type of supply/demand-based negotiation. In some embodiments, the negotiation may take place via a side-channel communication link between the receiver and transmitter. Micropayments may be provided via user accounts and/or other types of payments (e.g., auto debit, periodic billing, bank transfer, bitcoins, etc.).

In some cases, a user may set a desired rate or a plurality of rates they are willing to pay for the electrical power their device or devices receive. A user of a power transmitting device may set a desired rate they are willing to accept for the power their device provides to a receiver. In some cases, a server may arbitrage or make a market so as to efficiently provide an exchange of electrical power and payments between transmitting device and receiver device. Yet further, a machine learning algorithm may determine a user's pricing preferences based on prior behavior or anticipated behavior to provide limited or complete automation to the micropayment system.

In example embodiments, the server includes a cloud-based network. However, in other embodiments, the server could be distributed among transmitter devices, which may individually or jointly negotiate the unit cost of the transmitted power. For example, the server could be distributed among transmitters in a given building. In such a scenario, the owner of the building may have control to set prices for power transmission from transmitters within the building.

In some embodiments, the server and/or transmitting device may adjust its prices in real time. Furthermore, the prices may be based on a real-time power transmission efficiency. In such a scenario, the system may provide an incentive for the receiver device to move to a more efficient transmission arrangement (e.g., by moving with respect to the transmitter). Additionally, energy pricing may change in real time based on demands on the power grid locally (e.g., within a given building) or globally (e.g., within a city or region). That is, a city in summer may have a heightened power need during the day (e.g., to run lots of air conditioners). Accordingly, power transmission rates may be significantly higher during the day compared to overnight.

The price per kW may be adjusted based on a power need of the receiver device. For example, a price per kW may be low for a device that has a 90% charge. However, a receiver device with only a 10% battery charge may face higher rates per kW. In other words, if the receiver is serious need of power (and perhaps requires power transfer at a high C rate), the price per kW may be much higher than in other scenarios. Other contextually-based pricing adjustments are possible based on e.g., device location, time of day, user activity, charge level, battery usage rate, calendar events, etc.

II. Example Systems

FIG. 1A illustrates a system 100, according to an example embodiment. The system 100 includes a transmitter 110 and a receiver 120. The transmitter 110 may be a charger device configured to wirelessly transfer energy to one or more receiver devices. In some embodiments, the transmitter 110 may be owned and/or operated by a power utility, building owner, vehicle owner, roadway owner, etc. In such scenarios, the transmitter 110 may be incorporated into a utility pole (e.g., an antenna or a power pole), a building or building fixture (e.g., a table, wall, etc.), a vehicle (e.g., car, truck, aerial drone, etc.), or a roadway. In example embodiments, the transmitter 110 may be configured to provide power to a receiver upon reaching a mutually agreeable price for such a service.

In some embodiments, receiver 120 may be electrically coupled to an electronic device, such as a mobile phone, a laptop, a tablet, or an energy storage device. The receiver 120 may be wirelessly coupled to the transmitter 120 via a wireless resonant coupling link 130. In such a scenario, the transmitter 110 is configured to provide electrical energy to the receiver 120 via the wireless resonant coupling link 130. For example, the transmitter 110 may provide electrical power to a load 125 associated with receiver 120 and/or charge a battery or another energy storage device associated with receiver 120.

The system 100 may include a side-channel communication link 140. The side-channel communication link 140 may include a communication link established over BLUETOOTH, BLUETOOTH LOW ENERGY, Wireless LAN, WiMAX, IEEE 802.11, ZIGBEE, or another type of communication protocol or method. The side-channel communication link 140 may be configured to provide a bi-directional communication link between the transmitter 110 and the receiver 120. In such a scenario, identifying the receiver 120 or the transmitter 110 may be based on information received via the side-channel communication link 140. The system 100 also includes a controller 150 having at least one processor 152 and a memory 154.

In example embodiments, system 100 may include at least one impedance matching network 114 and/or 123 configured to adjust the efficiency of wireless energy transfer. The at least one impedance matching network 114 may be coupled to the transmitter 110. In example embodiments, the impedance matching network 114 may be placed in series with a transmit resonator 112. The transmit resonator 112 may include an antenna resonator device configured to resonate at a desired resonant frequency or frequencies. In other embodiments, the impedance matching network(s) 123 may additionally and/or alternatively be coupled to the receiver 120. Additionally or alternatively, the impedance matching network(s) 114 and/or 123 may be arranged in parallel and/or in series topologies. Furthermore, the impedance matching network(s) 114 and/or 123 may include any combination of L matching networks, pi networks, T networks, and/or multi-section matching networks.

In some embodiments, the system may deliver power to the load 125 by configuring the impedance matching network 114 and/or 123 to match a determined impedance value. In example embodiments, a controller (e.g., controller 150) of the system 100 may determine a power to deliver from the transmitter 110 to a receive resonator 121 and the load 125 associated with the receiver 120. The controller 150 may use information indicative of a reflected impedance (e.g., from the load 125 to the transmitter 110) to determine the impedance that the impedance matching network(s) 114 and/or 123 may be configured to match. Accordingly, the system 100 may most efficiently deliver the determined power to the load 125 associated with receiver 120 when the impedance matching network 114 and/or 123 matches the determined impedance.

The controller 150 of the system 100 may generate a model, such as a SPICE model, to determine the impedance that the impedance matching network 114 and/or 123 may match. The model may include known values such as the actual impedance of the load 125, which the controller 150 may receive from the receiver 120. However, the controller 150 may additionally or alternatively need to determine the actual power supplied to the load 125 from the transmitter 110 and the reflected impedance, from the load 125 to the transmitter 110, in order to fully characterize the model of the system 100 (e.g. to derive a coupling factor k). The controller 150 may use the fully characterized model of the system to dynamically adjust transmission conditions by continuously or periodically recalculating the impedance that the impedance matching circuit may match.

As an example, the system 100 may include a bidirectional coupler 116, which may be used to determine the actual supplied to the load 125 from the transmitter 110 and the reflected impedance from the load 125 to the transmitter 110. The bidirectional coupler 116 may be used in conjunction with controller 150 to precisely solve for an impedance of the load 125 connected to it. The bidirectional coupler 116 may also be used, in conjunction the controller 150, to precisely solve for the amount of power leaving a power source (e.g., power draw from an energy grid or energy storage device). The value of the reflected impedance of a load 125 and the amount power leaving the power source may be used to adjust the impedance matching network. Accordingly, the system 100 may be configured to dynamically impedance match by using the bidirectional coupler 116 to determine the actual power supplied by the power source and the reflected impedance from the load 125 to the transmitter 110.

In example embodiments, the bidirectional coupler 116 may be connected to the transmitter 110 and the receiver 120 so as to be configured to sense forward and reflected power waves. In some scenarios, a mathematical relationship between the incoming and outgoing waves on each port of the bidirectional coupler 116 may be used to precisely calculate the power delivered to the load 125 and reflected impedance back to the power source. The mathematical relationship may use an S-parameter characterization of the bidirectional coupler 116 to relate between the incoming and outgoing waves on each port of the bidirectional coupler 116.

Accordingly, the controller 150 may use such mathematical relationships to fully characterize the system 100. For example, figures of merit such as coupling factor k may be calculated. Further, the controller 150 may use the model of the system 100 to predict the amount of power that may be delivered to a load 125 by adjusting the impedance that the impedance matching circuit 114 and/or 123 may match. In some embodiments, the load 125 may include a battery, an energy storage device, or another type of device that consumes, stores, and/or conveys electrical energy.

In example embodiments, the processor 152 may execute instructions stored in the memory 154 so as to carry out further operations. For example, the operations may include identifying the receiver 120 and identifying the transmitter 110. Such operations may be part of an authentication protocol to verify the identity of the receiver 120 and the transmitter 110. As an example, identifying the receiver 120 may include receiving information regarding the unique identity of the receiver 120. Likewise, identifying the transmitter 110 may include receiving information regarding the unique identity of the transmitter 110.

For example, according to a challenge-handshake authentication protocol (CHAP), the transmitter 110 may issue a challenge to the receiver 120 when receiver 120 is within a transmission range or upon receiving a beacon signal from receiver 120. The challenge may include information about the identity of transmitter 110. Additionally or alternatively, the challenge may include a random character string. In response to the challenge, the receiver 120 may reply with self-identification information, a password, and/or a hashed version of the random character string (e.g., using an MD5 or BLAKE2 cryptographic hash function). As an alternative, extensible authentication protocol (EAP) is possible. It will be understood that other forms of authentication (e.g., checksums, single or multi-factor authentication, etc.) between the transmitter 110 and the receiver 120 are possible.

In response to verifying an identity of the transmitter 110 and/or the receiver 120 (e.g., via a successful password, authenticating a hash and/or checksum), further operations may be conducted as described below and elsewhere herein.

The operations include determining a real-time per-unit offer corresponding to the receiver 120. The per-unit offer may include an amount (per Joule, per kilowatt, per kilowatt hour, per Amp hour, etc.) that an owner or operator of the receiver 120 may be willing to pay to charge to receive power from the transmitter 110. As an example, an owner or operator of the receiver 120 may be willing to pay 10 cents per kilowatt (kW). The offer may be provided continuously or periodically to the controller 150 and/or the transmitter 110 via the side-channel communication link 140 or another communication link.

In example embodiments, the offer may be based on a preset price, a floating price, or a price framework. For example, the offer may float according to a market rate for wireless energy transfer. Additionally or alternatively, the offer may be based on a price framework that may factor in several variables including, but not limited to, the time of day, energy usage rate, type of device, type of receiver, etc. In some scenarios, an owner of a device associated with receiver 120 may choose a price, a price range, or a price framework for what they are willing to pay for wireless energy transfer service to their device.

In some embodiments, the offer may change dynamically to reflect various use contexts. For example, the offer may generally increase in relation to an actual and/or anticipated need for energy. That is, in cases where the associated device may have a low battery charge level (e.g., below 20% or below 10%), a given price framework may increase the offer to reflect a greater immediate need for the energy transfer. Furthermore, in cases where an amount of time before the next anticipated charging opportunity is more than a threshold amount of time (e.g., time to 10%, based on current/recent device usage), the offer may increase.

Conversely, all things being equal, the offer may decrease if the anticipated need for energy is lower than normal. For example, if a battery associated with receiver 120 is above a threshold amount (e.g., 95% of full capacity) or if the device associated with receiver 120 is in a low energy usage state, the offer may be lower than normal/average.

The operations also include determining a real-time per-unit request corresponding to the transmitter 110. That is, an owner and/or operator of the transmitter 110 may select, elect, or otherwise choose a per-unit price, a per-unit price range, or a per-unit price schedule at which the owner and/or operator is willing to sell energy transfer services via the transmitter 110. For instance, the operator of transmitter 110 may choose to sell power at a per-unit price of 8 cents per kW.

Similar to the offer amount, the request amount may change dynamically based on contextual states and/or events. That is, the request amount may be based on various supply and demand indicators. For example, all things equal, the request may increase if energy grid usage is heavy (e.g., less available energy supply) or if a current power supply rate is greater than a threshold amount. For example, during the day on a hot day, energy grid usage may be relatively high due to widespread use of air conditioning. In such a scenario, the request may be relatively high. Furthermore, if the transmitter 110 is already providing power to the receiver 120 and/or other receivers at a rate greater than a threshold rate (e.g., 5 kW), the request may increase above an average or normal price. In some embodiments, the request amount may be determined based on other supply and demand indicators.

In some embodiments, the operator of transmitter 110 may choose to sell a certain amount of energy or power (e.g., an amp hour or a kilowatt) at a "bulk" rate, which may be lower than a per-unit rate.

The operations further include determining a real-time per-unit match based on the offer and the request. That is, a market maker may collect one or more offers and requests in an attempt to find a match between the transmitter 110 and the receiver 120 under mutually-acceptable payment and power delivery terms. In example embodiments, the market maker may determine the real-time per-unit match rate by splitting the difference between the offer and the request. That is, in the case where the request is 8 cents/kW and the offer is 10 cents/kW, the market maker may determine the real-time per-unit match rate to be 9 cents/kW. It will be understood that the market maker may determine the real-time per-unit match rate using other methods and all such other methods are contemplated herein.

In some cases, the market maker may retain some or all of the "spread" between the offer and the request (e.g., 2 cents in the above-example) as a fee for providing the match.

It will be understood that the match rate (e.g., 9 cents/kW) could be used as a basis for calculating a total fee for the transmitter 110 providing energy transfer services to the receiver 120. The total fee could include, for example, the total number of kW received by the receiver 120 multiplied by the match rate. Additionally or alternatively, the total fee could include the total number of kW provided by the transmitter 110 multiplied by the match rate. As the efficiency could vary significantly based on the spatial relationship between the coils and other environmental factors, the total fee could vary depending on whether it is calculated per received unit energy/power or per transmitted unit energy/power.

In example embodiments, the market maker may take into account an estimated efficiency of a given wireless resonant energy transfer link between a given receiver and transmitter pair in the system. In some cases, the market maker may add a surcharge in cases where the estimated efficiency is below a threshold efficiency level. As an example, the surcharge may provide an incentive for an owner/operator of the receiver to move to a better position and/or upgrade to a higher efficiency receiver. In other words, parties with higher efficiency receivers may pay less than those with lower-efficiency models.

In some embodiments, if no match is possible, the market maker may inquire whether an owner/operator of the transmitter 110 and/or the receiver 120 is willing to decrease the prior request or increase the prior offer, respectively. The market maker may periodically poll the owner/operator of the transmitter 110 and/or the receiver 120 to obtain the most current offer and request information.

In example embodiments, the market maker may perform other functions, such as determining software and/or hardware compatibility between the transmitter 110 and the receiver 120. For example, the market maker may match offers and requests from corresponding receivers and transmitters in cases where, for example, their respective resonant antennas have overlapping resonant frequency ranges. If the respective resonant antennae, or other elements of the wireless energy transfer link are not compatible with one another, the market maker may determine to not try to match the respective offer and request based on the incompatibility.

Additionally or alternatively, the market maker may help optimize the overall system for efficiency. That is, in the market maker may prioritize matching requests from transmitters with offers from receivers when the wireless power transfer efficiency may be anticipated to be higher-than-average or anticipated to be greater than a threshold efficiency level (e.g., 95%). In an example embodiment, a relatively inefficient receiver may receive a lower priority by the market maker. Such matching prioritization based on real or anticipated energy transfer efficiency may reduce waste over an entire wireless energy transfer system. It will be understood that the market maker may be further configured to take other actions to improve transfer efficiency and/or matching speed.

Yet further, the operations include, in response to determining the match, causing the transmitter 110 to provide electrical energy to the receiver 120 via the wireless resonant coupling link 130. In example embodiments, a transmit resonator 112 associated with the transmitter 110 may transfer energy to a corresponding receive resonator 121 associated with the receiver 120 via a non-radiative near-field resonant energy transfer process. In such a scenario, the energy transfer may occur based on the transmitter 110 and transmit resonator 112 exciting a resonant mode in the receive resonator 121 associated with the receiver 120 at a resonant frequency common to both the transmit resonator 112 and the receive resonator 121.

In some embodiments, the processes of determining an offer, determining a request, and/or determining a match may occur without real-time user interaction. That is, the systems and methods described herein may happen in an autonomous or semi-autonomous manner.

In some embodiments, determining at least one of: the offer, the request, or the match may be based on an auction process. That is, an owner/operator of a transmitter 110 (e.g., a building owner or utility company) may offer per-unit or bulk wireless energy transmission services for sale and accept bids from one or more owners/operators of receiver devices. In such a scenario, the owner/operator of the transmitter 110 may sell its energy transmission services to the highest bidder according to conventions of an open, ascending price auction process. It will be understood that other types of auction processes are possible. For example, according to a Dutch auction process, the owner/operator of the transmitter 110 may begin the auction process by requesting a high price and periodically lowering the request amount until a willing purchaser (e.g., the owner/operator of the receiver 120) is established.

Additionally or alternatively, determining at least one of: the offer, the request, or the match may be based on a supply-demand relationship. In such embodiments, as a wireless energy transfer service may be part of a competitive energy market, the unit price or bulk price for such services may settle to an equilibrium price based on a present supply and demand of such services. In other words, the price of energy transfer services may be determined by a balance between the production at each price (e.g., the supply) and the purchasing power at each price (e.g., the demand). As such, the offer, the request, and/or the match may be determined based on a calculation or an estimation of the present supply and present demand for energy transfer services. Such a calculation or estimation may be based on a number of transmitters and/or receivers in a given area, the overall energy transfer capacity of the transmitters, and/or the overall energy transfer need of the receivers. It will be understood that other considerations that impact supply and demand for energy transfer services are contemplated within the scope of the present disclosure.

In some embodiments, a given power transmitter may be operating near capacity while providing energy transfer services for multiple competing receivers. As the transmitter begins to approach its maximum current or field density limit (e.g., 90% of limit), the transmitter may increase a global request amount. Additionally or alternatively, the transmitter may decrease a request amount for receivers with which the transmitter may provide energy above a threshold efficiency. In some embodiments, the transmitter may extend customized tiered request amounts based on an actual or anticipated transfer efficiency with a given receiver. That is, for each receiver in an environment, the transmitter may provide an individualized request amount to each potential receiver in the environment based on the respective transfer efficiency at which energy could be transferred.

In example embodiments, determining the offer corresponding to the receiver 120 may be further based on at least one of: a use context, a present need for electrical energy, an anticipated need for electrical energy, a desired price, or a pricing preference. For example, all other things equal, the offer amount may increase based on a low battery condition or an anticipated lack of energy transfer (charging) possibilities. The offer may additionally or alternatively be based on a coupling factor k. For instance, all other factors equal, the offer may decrease based on a relatively high coupling factor. That is, as the power transfer efficiency is relatively high, an owner/operator of transmitter 110 may accept a lower offer because less power is being wasted.

As described herein, a "use context" could include a variety of conditions and/or events including, but not limited to, a time of day, a present location of a device associated with the receiver 120, a battery level, a route to be traveled, a number of other receivers in the local vicinity, an anticipated activity (e.g., hiking, running, sleeping, etc.), an anticipated location (e.g., a location out of range of a transmitter), or a known schedule or itinerary (e.g., flight plan, daily commute, agenda, or meeting plan).

In example embodiments determining the request corresponding to the transmitter 110 may be further based on at least one of: an energy storage device level, a time of day, an amount of other connected receivers, a desired price, or a pricing preference.

In some embodiments, causing the transmitter 110 to provide electrical energy to the receiver 120 may be performed responsive to receiving notification of a payment based on the match. That is, in some cases, the transmitter 110 may provide energy transfer services to receivers after receiving payment information. In other embodiments, the respective owner/operators of the transmitter 110 and the receiver 120 may provide payment via a service contract or another type of agreement.

Additionally or alternatively, in response to determining the match, the operations may include providing a payment via at least one of: a user account, an auto debit transfer, a periodic transfer, or a one-time transfer.

In some embodiments, in emergency scenarios or other predetermined situations, a transmitter 110 may be operable to provide energy transfer services without an indication of pre-payment or existence of a service contract or agreement.

In some embodiments, the operations may include estimating a transmission efficiency between the transmitter 110 and the receiver 120. The estimated transmission efficiency may be based on information including, but not limited to, a relative position of the transmitter 110 and the receiver 120, a relative humidity, a map of objects in the local environment, a SPICE model of an equivalent circuit that includes the transmitter 110 and the receiver 120, information received from the matching networks 114 or 123, the bidirectional coupler 116, and/or coil layouts of the respective resonant antennas. Furthermore, the offer and/or the request could be based on the estimated transmission efficiency. In example embodiments, the estimated transmission efficiency may be based on the physical and spatial attributes of a given transmitter/receiver pair as well as the local environment.

In a further embodiment, the operations may additionally include receiving information indicative of a real-time transmission efficiency between the transmitter 110 and the receiver 120. In such a scenario, determining at least one of the offer or the request may be based on the received information of the real-time transmission efficiency. As described herein, as it may be more cost-effective to provide energy in scenarios where the energy transmission efficiency is high, service providers may lower their corresponding request amounts. In some embodiments, such service providers may incentivize owners/operators of receivers to move or otherwise adjust an orientation of their receiver so as to improve and/or maximize energy transmission efficiency (e.g., increase or optimize coupling factor k).

In example embodiments, the operations include causing at least one of the transmitter 110 or the receiver 120 to move so as to increase the real-time transmission efficiency between the transmitter 110 and the receiver 120. For example, the operations may include adjusting a position, orientation, or another aspect of the transmitter 110 or the receiver 120 to improve energy transmission efficiency between the transmitter 110 and the receiver 120. In some embodiments, the transmitter 110 or the receiver 120 may be attached to gimbal mounts that may be adjusted via an actuator. In such scenarios, the operations may include causing the actuator to move the gimbal mount so as to improve overall transmission efficiency.

It will be understood that other ways to improve or optimize transmission efficiency are contemplated. For instance, some embodiments may include that at least one of the transmitter 110 or the receiver 120 selecting a desired coil from a plurality of coils so as to best match an orientation of a corresponding transmit/receive coil. In other words, a transmitter 110 could include two coils. A first coil could be arranged in a first orientation (e.g., vertically-aligned) and a second coil could be arranged in a second orientation (e.g., horizontally-aligned). As such, in an effort to improve transmission efficiency, the transmitter 110 could select the first coil or the second coil based on an estimated transmission efficiency or an actual transmission efficiency. In some embodiments, the transmitter 110 could send power via each of the coils in succession to determine the combination of transmit/receive coils that may provide the highest transmission efficiency. Thereafter, the combination of transmit/receive coils that provide the highest transmission efficiency may be selected to provide further energy transfer services.

In some embodiments, the operations may further include determining an energy transfer rate. In such a scenario, causing the transmitter 110 to provide electrical energy to the receiver 120 may include causing the transmitter 110 to provide electrical energy at the determined energy transfer rate to the receiver 120. In other words, the receiver 120 may be configured to accept energy at a preset energy transfer rate or the receiver 120 may specifically request energy transfer at a desired energy transfer rate. In such scenarios, the transmitter 110 may be operable to provide energy to the receiver 120 at such desired or preset energy transfer rates.

Figure 1B:
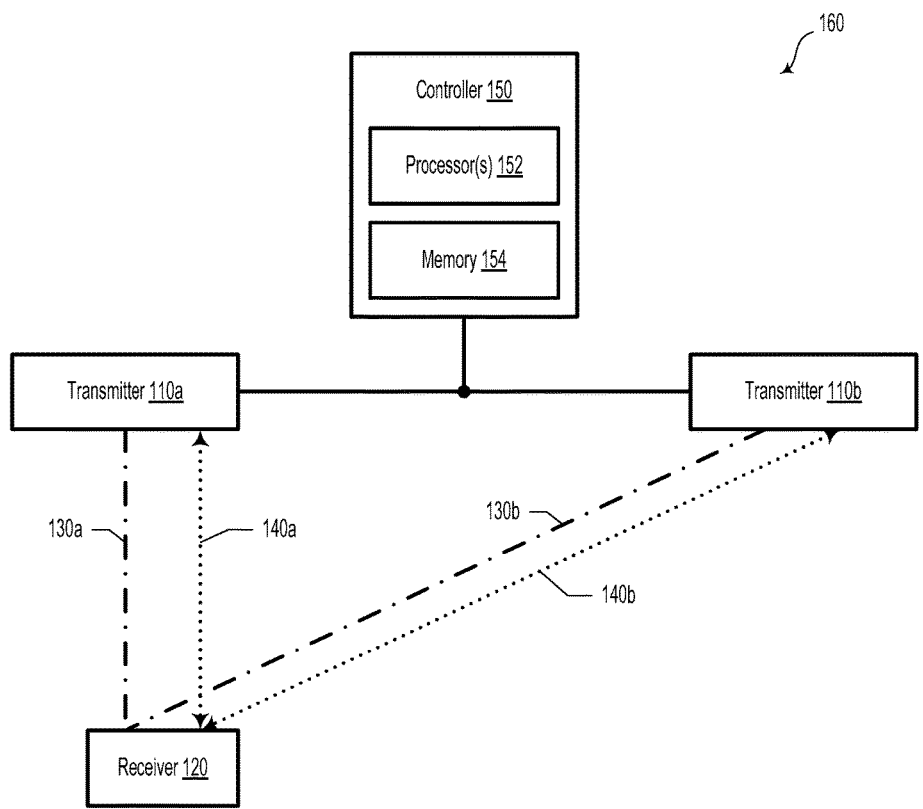
FIG. 1B illustrates a system, according to an example embodiment.

FIG. 1B illustrates a system 160, according to an example embodiment. As illustrated in FIG. 1B, system 160 may include a plurality of transmitters (e.g., transmitters 110a and 110b). In such a scenario, receiver 120 may establish multiple wireless resonant coupling links with one or more of the plurality of transmitters (e.g., wireless resonant coupling links 130a and 130b).

Additionally or alternatively, receiver 120 may establish side-channel communication links with one or more of the plurality of transmitters (e.g., side-channel communication links 140a and 140b).

In example embodiments, receiver 120 may be associated with an electronic device (e.g., a cellphone). In such a scenario, as the device moves around a given environment, it may be advantageous from an efficiency and/or pricing perspective to switch from one energy provider to another (e.g., from transmitter 110a to 110b). That is, while at a first location and at a first time, receiver 120 may receive energy from transmitter 110a via wireless resonant coupling link 130a. Receiver 120 may move closer to transmitter 110b such that it is much more efficient and perhaps less costly to receive energy from transmitter 110b. As such, the receiver 120 may communicate with both transmitter 110a and 110b to request, and initiate, a soft handover (e.g., a make-before-break handoff). While the receiver 120 is still receiving energy from transmitter 110a, the soft handover may include initiating wireless energy transfer with transmitter 110b (e.g., via wireless resonant coupling link 130b) before terminating wireless resonant coupling link 130a.

While FIG. 1B illustrates system 160 having two transmitters 110a and 110b, it will be understood that more transmitters may be possible. Indeed, some embodiments described herein may include 3-10 transmitters, 10-100 transmitters, or more than 100 transmitters in a given local environment.

Figure 1C:
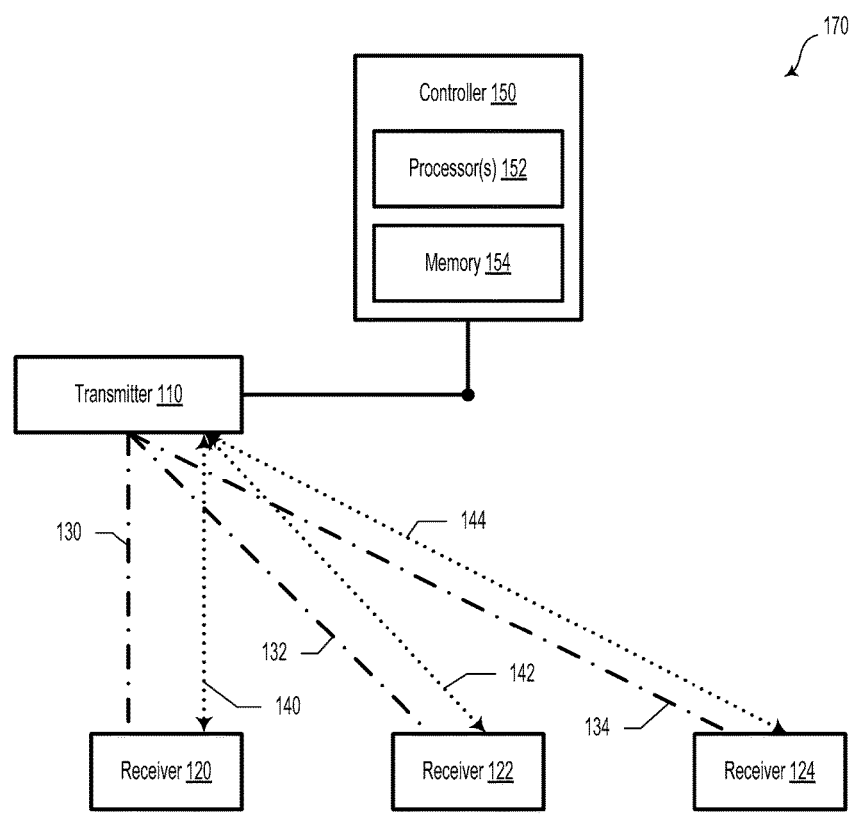
FIG. 1C illustrates a system, according to an example embodiment.

FIG. 1C illustrates a system 170, according to an example embodiment. As illustrated in FIG. 1C, system 170 may include a plurality of receivers (e.g., receivers 120, 122, and 124). In such a scenario, the receiver 120 may be coupled to transmitter 110 via wireless resonant coupling link 130 and side-channel communication link 140. Furthermore, receiver 122 may be coupled to transmitter 110 via wireless resonant coupling link 132 and side-channel communication link 142. Additionally, receiver 124 may be coupled to transmitter 110 via wireless resonant coupling link 134 and side-channel communication link 144.

System 170 may utilize time-division multiplexing (TDM) to transfer energy from transmitter 110 to the respective receivers 120, 122, and 124. That is, transmitter 110 may divide energy transfer among the plurality of receivers via different time intervals or timeslots. Alternatively, transmitter 110 may be configured to provide energy to some or all of the plurality of receivers at the same time. It is understood that other methods to divide and/or apportion energy transfer services between multiple receivers 120, 122, and 124 are contemplated herein.

Figure 1D:
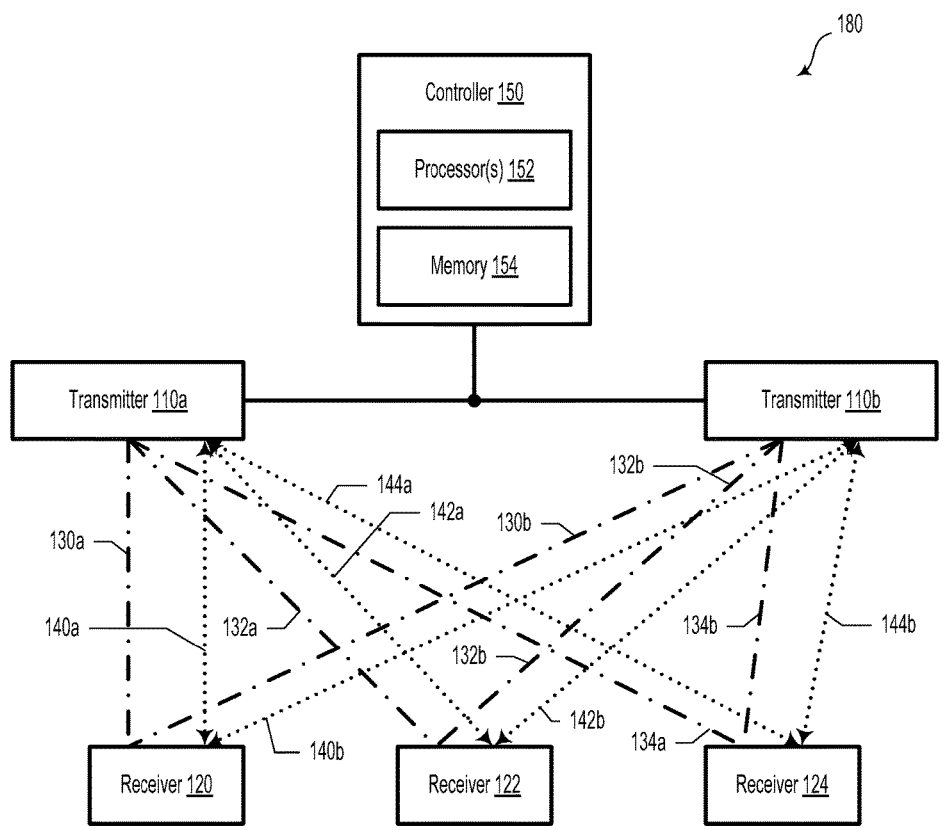
FIG. 1D illustrates a system, according to an example embodiment.

FIG. 1D illustrates a system 180, according to an example embodiment. As illustrated in FIG. 1D, system 180 may include a plurality of receivers (e.g., receivers 120, 122, and 124) as well as a plurality of transmitters (e.g., transmitters 110a and 110b). In such a scenario, the receivers 120, 122, and 124 may be coupled to transmitter 110a via respective wireless resonant coupling links 130a, 132a, and 134a and respective side-channel communication links 140a, 142a, and 144a. Furthermore, receivers 120, 122, and 124 may be coupled to transmitter 110b via respective wireless resonant coupling links 130b, 132b, and 134b and respective side-channel communication links 140b, 142b, and 144b.

It will be understood that while FIG. 1D illustrates a plurality of receivers and a plurality of transmitters, other operational scenarios may include more or fewer receivers and/or transmitters. Furthermore, it is contemplated that different operational classes of transmitters are possible. That is, the wireless transmitters may be configured to provide various services in various rate ranges. For instance, a first transmitter may be operable to provide up to 100 kW of wireless power transfer to receivers while a second transmitter may be operable to provide up to 10 kW of wireless power transfer to receivers. Furthermore, the wireless transmitters may be part of a power distribution network and/or power grid.

In example embodiments, a receiver of transferred power could, in turn, also serve as a transmitter (either while receiving power or at a later time). That is, wireless power transceivers (e.g., devices that may act as either power receivers and power transmitters) may distribute power via a plurality of repeater devices. In some cases, the wireless power transceivers may provide an offer amount and/or request amount based on any of the methods and systems described herein. Namely, the market maker may give "tie-breaker" preference to authenticated transceivers and/or handicap some transceivers (e.g., transceivers that may transfer power at lower than average transfer efficiency levels). In an example embodiment, a group of transceivers may provide favorable offer and/or request amounts to a corporate partner or known third-party supplier based on a pre-existing contract, mutual business interests, or for another reason.

III. Example Methods

Figure 2:
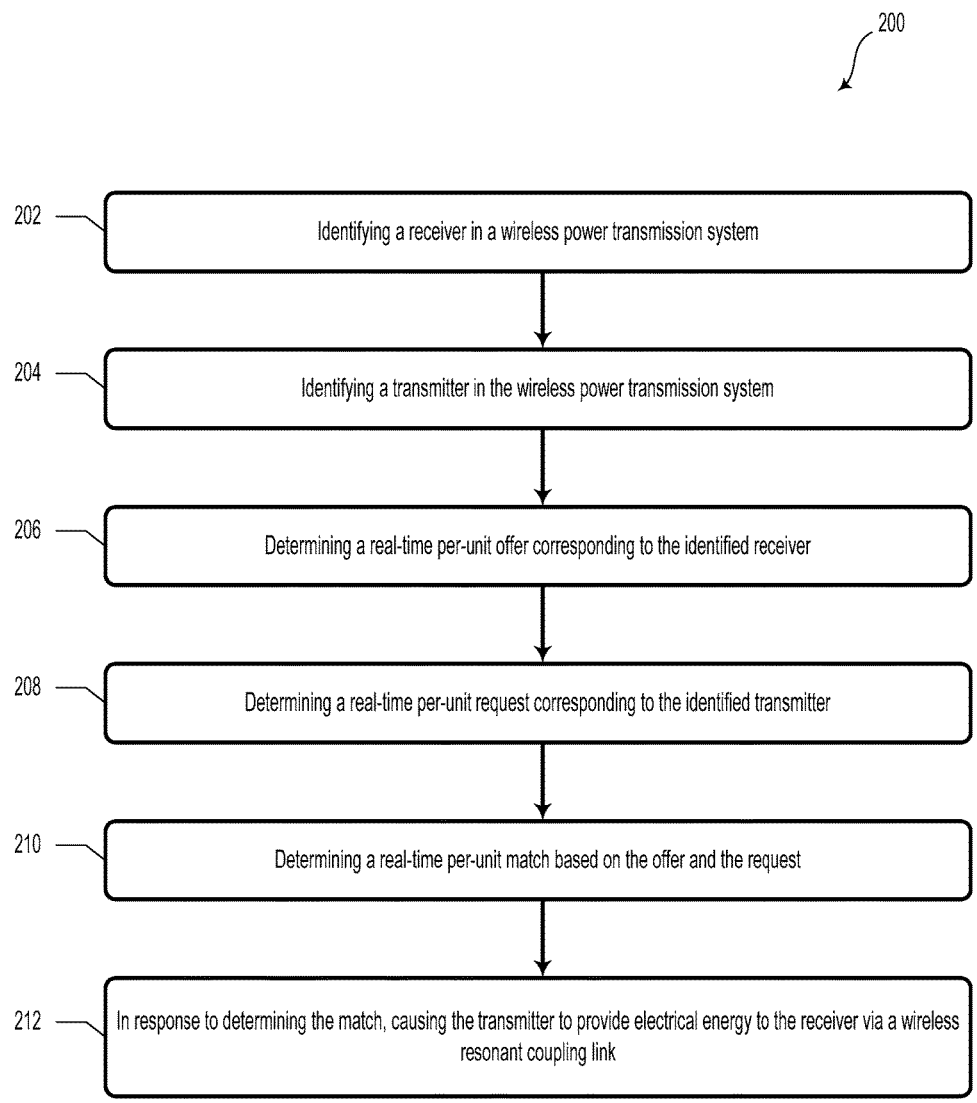
FIG. 2 illustrates a method, according to an example embodiment.

FIG. 2 illustrates a method 200, according to an example embodiment. The method 200 may include various blocks or steps. The blocks or steps may be carried out individually or in combination. The blocks or steps may be carried out in any order and/or in series or in parallel. Further, blocks or steps may be omitted from or added to method 200.

Some or all blocks of method 200 may involve elements of systems 100, 160, 170, or 180 as illustrated and described in reference to FIGS. 1A, 1B, 1C, and 1D. Furthermore, some or all blocks of method 200 may be carried out by controller 150 and/or processor 152 and memory 154.

Block 202 includes identifying a receiver in a wireless power transmission system.

Block 204 includes identifying a transmitter in the wireless power transmission system. In some embodiments, blocks 202 (identifying the receiver) and 204 (identifying the transmitter) may be based on authentication information received via the side-channel communication link. That is, as described elsewhere herein, identifying the receiver and/or the transmitter may be part of an authentication protocol to verify the identity of the receiver and/or the transmitter. Identifying the receiver may include receiving information regarding the unique identity of the receiver. Likewise, identifying the transmitter may include receiving information regarding the unique identity of the transmitter.

Block 206 includes determining a real-time per-unit offer corresponding to the identified receiver. As described elsewhere herein, the per-unit offer may include an amount that an owner or operator of the receiver may be willing to pay to charge to receive power from the transmitter.

Block 208 includes determining a real-time per-unit request corresponding to the identified transmitter. In example embodiments, an owner and/or operator of the transmitter may select, elect, or otherwise choose a per-unit price, a per-unit price range, or a per-unit price schedule at which the owner and/or operator is willing to sell energy transfer services via the transmitter.

Block 210 includes determining a real-time per-unit match based on the offer and the request. As described elsewhere herein, a market maker may collect one or more offers and requests in an attempt to find a match between the transmitter and the receiver under mutually-acceptable payment and power delivery terms.

Block 212 includes, in response to determining the match, causing the transmitter to provide electrical energy to the receiver via a wireless resonant coupling link. In example embodiments, a transmit resonator associated with the transmitter may transfer energy to a corresponding receive resonator associated with the receiver via a non-radiative near-field resonant energy transfer process. For example, the energy transfer may occur based on the transmitter and transmit resonator exciting a resonant mode in the receive resonator associated with the receiver at a resonant frequency common to both the transmit resonator and the receive resonator.

In some embodiments, as described elsewhere herein, determining at least one of: the offer, the request, or the match may be based on an auction process or a supply-demand relationship.

In example embodiments, the wireless power transmission system further includes a side-channel communication link. In such a scenario, the side-channel communication link may be configured to provide a bi-directional communication link between the transmitter and the receiver. Some or all of the communication steps or blocks described herein (e.g., offer, request, match, identifying receivers/transmitters, communicating use context information etc.) may be carried out based on messages transmitted via the side-channel communication link.

Furthermore, some embodiments include receiving information indicative of a real-time transmission efficiency between the transmitter and the receiver. In such scenarios, determining at least one of the offer or the request may be based on the received information regarding real-time transmission efficiency. For example, the transmitter and/or the receiver may monitor the real-time transmission efficiency of the wireless resonant coupling link so as to reduce and/or minimize inefficiency in the energy transfer process. Based on the received information, the method 200 may include adjusting a position or orientation of the transmitter and/or the receiver or prompt a user to adjust such positions or orientations.

Figure 3:
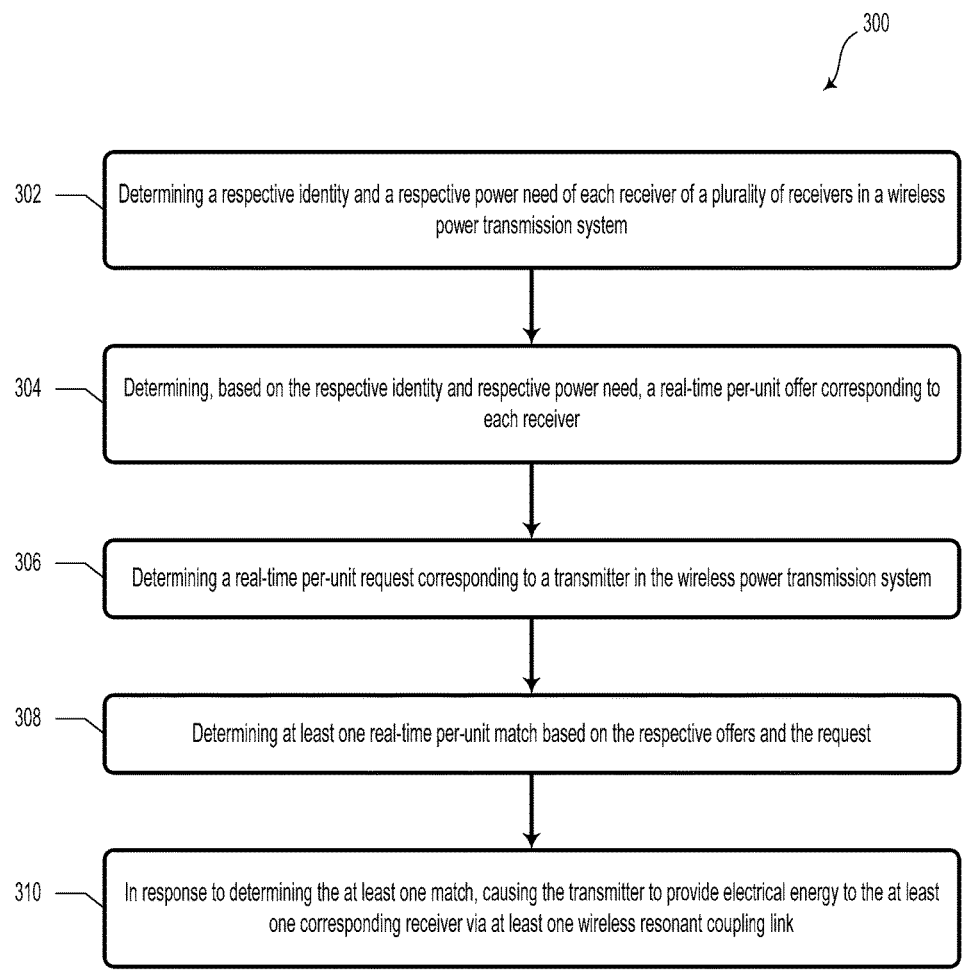
FIG. 3 illustrates a method, according to an example embodiment.

FIG. 3 illustrates a method 300, according to an example embodiment. The method 300 may include various blocks or steps. The blocks or steps may be carried out individually or in combination. The blocks or steps may be carried out in any order and/or in series or in parallel. Further, blocks or steps may be omitted from or added to method 300.

Some or all blocks of method 300 may involve elements of systems 100, 160, 170, or 180 as illustrated and described in reference to FIGS. 1A, 1B, 1C, and 1D. Furthermore, some or all blocks of method 300 may be carried out by controller 150 and/or processor 152 and memory 154.

Block 302 includes determining a respective identity and a respective power need of each receiver of a plurality of receivers in a wireless power transmission system. In other words, method 300 may include determining an identity and a use context of one or more receivers in the plurality of receivers in the wireless power transmission system (e.g., the local environment).

Block 304 includes determining, based on the respective identity and respective power need, a real-time per-unit offer corresponding to each receiver. That is, based on the plurality of receivers and their respective use contexts, block 304 may include associating a respective offer amount with each receiver of the plurality of receivers in the system.

Block 306 includes determining a real-time per-unit request corresponding to a transmitter in the wireless power transmission system. In example embodiments, the method 300 may include determining the request based on a present or anticipated demand for energy transfer services that may be provided by the transmitter.

Block 308 includes determining at least one real-time per-unit match based on the respective offers and the request. As described elsewhere herein, a match maker may link up mutually acceptable requests for transmitters and offers from receivers.

Block 310 includes, in response to determining the at least one match, causing the transmitter to provide electrical energy to the at least one corresponding receiver via at least one wireless resonant coupling link. In example embodiments, a transmit resonator associated with the transmitter may transfer energy to a corresponding receive resonator associated with the receiver via a non-radiative near-field resonant energy transfer process. In such a scenario, the energy transfer may occur based on the transmitter and transmit resonator exciting a resonant mode in the receive resonator associated with the receiver at a resonant frequency common to both the transmit resonator and the receive resonator.

In example embodiments, the wireless power transmission system may include at least one side-channel communication link. In such a scenario, the at least one side-channel communication link may be configured to provide a bi-directional communication link between the transmitter and the respective receivers. As described elsewhere herein, the side-channel communication link may be operable to provide exchange of any item of information described herein (e.g., offers, requests, matches, use contexts, etc.).

In some embodiments, determining the respective identity and the respective power need of each receiver of the plurality of receivers may be based on information received via the side-channel communication link.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
    a transmitter;
    a receiver coupled to the transmitter via a wireless resonant coupling link, wherein the transmitter is configured to provide electrical energy to the receiver via the wireless resonant coupling link;
    a controller comprising at least one processor and a memory, wherein the processor executes instructions stored in the memory so as to carry out operations, the operations comprising:
        carrying out an authentication protocol to authenticate the receiver;
        identifying the receiver as part of the authentication protocol;
        identifying the transmitter;
        determining a real-time per-unit offer corresponding to the receiver;
        determining a real-time per-unit request corresponding to the transmitter;
        determining a real-time per-unit match based on the real-time per-unit offer and the real-time per-unit request; and
        in response to determining the real-time per-unit match, causing the transmitter to provide the electrical energy to the receiver via the wireless resonant coupling link;
    wherein determining the real-time per-unit match based on the real-time per-unit offer and the real-time per-unit request comprises prioritizing the real-time per-unit offer when an anticipated efficiency of power transfer from the transmitter to the receiver exceeds a threshold.

2. The system of claim 1, wherein determining at least one of: the real-time per-unit offer, the real-time per-unit request, or the real-time per-unit match is based on an auction process.

3. The system of claim 1, wherein determining at least one of: the real-time per-unit offer, the real-time per-unit request, or the real-time per-unit match is further based on a supply-demand relationship.

4. The system of claim 1, further comprising a side-channel communication link, wherein the side-channel communication link is configured to provide a bi-directional communication link between the transmitter and the receiver.

5. The system of claim 4, wherein identifying the receiver or the transmitter is based on information received via the side-channel communication link.

6. The system of claim 1, wherein determining the real-time per-unit offer is further based on at least one of: a use context, a present need for electrical energy, an anticipated need for electrical energy, a desired price, or a pricing preference.

7. The system of claim 1, wherein determining the real-time per-unit request is further based on at least one of: an energy storage device level, a time of day, an amount of other connected receivers, a desired price, or a pricing preference.

8. The system of claim 1, wherein causing the transmitter to provide the electrical energy to the receiver is responsive to receiving notification of a payment based on the real-time per-unit match.

9. The system of claim 1, wherein in response to determining the real-time per-unit match, providing a payment via at least one of: a user account, an auto debit transfer, a periodic transfer, or a one-time transfer.

10. The system of claim 1, wherein the operations further comprise receiving information indicative of a real-time transmission efficiency between the transmitter and the receiver, wherein determining at least one of the real-time per-unit offer or the real-time per-unit request is based on the received information.

11. The system of claim 10, wherein the operations further comprise causing at least one of the transmitter or the receiver to move so as to increase the real-time transmission efficiency between the transmitter and the receiver.

12. The system of claim 1, wherein the operations further comprise determining an energy transfer rate, wherein causing the transmitter to provide the electrical energy to the receiver comprises causing the transmitter to provide the electrical energy at the determined energy transfer rate to the receiver.

13. A method comprising:
carrying out an authentication protocol to authenticate a receiver in a wireless power transmission system;
identifying the receiver as part of the authentication protocol;
identifying a transmitter in the wireless power transmission system;
determining a real-time per-unit offer corresponding to the identified receiver;
determining a real-time per-unit request corresponding to the identified transmitter;
determining a real-time per-unit match based on the real-time per-unit offer and the real-time per-unit request; and
in response to determining the real-time per-unit match, causing the transmitter to provide electrical energy to the receiver via a wireless resonant coupling link;
wherein determining the real-time per-unit match based on the real-time per-unit offer and the real-time per-unit request comprises prioritizing the real-time per-unit offer when an anticipated efficiency of power transfer from the transmitter to the receiver exceeds a threshold.

14. The method of claim 13, wherein determining at least one of: the real-time per-unit offer, the real-time per-unit request, or the real-time per-unit match is based on an auction process or a supply-demand relationship.

15. The method of claim 13, wherein the wireless power transmission system further comprises a side-channel communication link, wherein the side-channel communication link is configured to provide a bi-directional communication link between the transmitter and the receiver.

16. The method of claim 15, wherein identifying the transmitter is also part of the authentication protocol, and wherein authentication information is received via the side-channel communication link.

17. The method of claim 15, further comprising receiving information indicative of a real-time transmission efficiency between the transmitter and the receiver, wherein determining at least one of the real-time per-unit offer or the real-time per-unit request is based on the received information.

18. A method comprising:
determining a respective identity and a respective power need of each receiver of a plurality of receivers in a wireless power transmission system;
carrying out an authentication protocol to authenticate each receiver;
determining, based on the respective identity and respective power need, a real-time per-unit offer corresponding to each receiver;
determining a real-time per-unit request corresponding to a transmitter in the wireless power transmission system;
determining at least one real-time per-unit match based on the respective real-time per-unit offers and the real-time per-unit request; and
in response to determining the at least one real-time per-unit match, causing the transmitter to provide electrical energy to the at least one corresponding receiver via at least one wireless resonant coupling link;
wherein determining the at least one real-time per-unit match based on the respective real-time per-unit offers and the real-time per-unit request comprises prioritizing the respective real-time per-unit offers when an anticipated efficiency of power transfer from the transmitter to the receiver exceeds a threshold.

19. The method of claim 18, wherein the wireless power transmission system further comprises at least one side-channel communication link, wherein the at least one side-channel communication link is configured to provide a bi-directional communication link between the transmitter and the respective receivers.

20. The method of claim 19, wherein determining the respective identity and the respective power need of each receiver of the plurality of receivers is based on information received via the side-channel communication link.

* * * * *